(12) United States Patent
Teetzel

(10) Patent No.: US 10,841,541 B2
(45) Date of Patent: Nov. 17, 2020

(54) WEARABLE ILLUMINATING AND VIDEO RECORDING DEVICES, SYSTEMS, AND METHODS OF USE THEREOF

(71) Applicant: Wilcox Industries Corp., Newington, NH (US)

(72) Inventor: James W. Teetzel, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 16/292,853

(22) Filed: Mar. 5, 2019

(65) Prior Publication Data

US 2019/0199975 A1 Jun. 27, 2019

Related U.S. Application Data

(62) Division of application No. 15/366,085, filed on Dec. 1, 2016, now Pat. No. 10,271,022.

(Continued)

(51) Int. Cl.
*H04N 7/18* (2006.01)
*F41G 1/35* (2006.01)
*H04N 5/225* (2006.01)
*H04N 5/232* (2006.01)
*H04N 5/77* (2006.01)
(Continued)

(52) U.S. Cl.
CPC ........... *H04N 7/185* (2013.01); *F41A 17/063* (2013.01); *F41G 1/35* (2013.01); *H04N 5/2252* (2013.01); *H04N 5/2256* (2013.01); *H04N 5/232* (2013.01); *H04N 5/23203* (2013.01); *H04N 5/772* (2013.01); *H04N 5/91* (2013.01)

(58) Field of Classification Search
CPC ........ F41G 3/2605; F41G 3/2611; F41G 3/26; H04N 7/185
See application file for complete search history.

(56) References Cited

U.S. PATENT DOCUMENTS 6,302,796 B1   10/2001   Lebensfeld et al.
9,628,708 B2    4/2017   Cucci et al.
(Continued)

FOREIGN PATENT DOCUMENTS

WO   WO-2015168649 A1 * 11/2015   ............. H04N 7/181

*Primary Examiner* — Stephen Johnson
(74) *Attorney, Agent, or Firm* — McLane Middleton, Professional Association

(57) ABSTRACT

A wearable illuminating and video recording system for use in conjunction with a handheld firearm includes a housing having first and second ports in a surface of the housing. A light source is disposed within the housing and positioned to emit light through the first port. A camera module is disposed within the housing and positioned to detect images through the second port. A recording module is disposed within the housing for receiving a video signal from the camera and storing data representative of the video signal. A power supply is disposed within the housing for providing power to operate the light source, camera, and recording module. An RF tag is disposed within the housing and a circuit including an RFID reader is associated with the firearm. The RFID reader is configured to transmit signals to the RF tag and receive signals from the RF tag and the circuit is configured to control operation of the firearm.

4 Claims, 4 Drawing Sheets

Related U.S. Application Data

(60) Provisional application No. 62/262,087, filed on Dec. 2, 2015.

(51) Int. Cl.
 *F41A 17/06* (2006.01)
 *H04N 5/91* (2006.01)

(56) References Cited

U.S. PATENT DOCUMENTS

| | | |
|---|---|---|
| 9,863,622 B1 | 1/2018 | Armer et al. |
| 2001/0048596 A1 | 12/2001 | Kerr |
| 2003/0089017 A1 | 5/2003 | Roush |
| 2003/0163827 A1 | 8/2003 | Purpura |
| 2005/0179799 A1* | 8/2005 | Umanskiy ............... F41C 27/00 348/333.01 |
| 2014/0092299 A1* | 4/2014 | Phillips .................. F16M 11/10 348/376 |
| 2016/0078257 A1* | 3/2016 | Liou .................. G06K 7/10792 340/10.3 |
| 2016/0337618 A1 | 11/2016 | Chapman et al. |
| 2017/0163942 A1 | 6/2017 | Teetzel |

* cited by examiner

WEARABLE ILLUMINATING AND VIDEO RECORDING DEVICES, SYSTEMS, AND METHODS OF USE THEREOF

CROSS REFERENCE TO RELATED APPLICATIONS

This application is a divisional of application Ser. No. 15/366,085 filed Dec. 1, 2016, now U.S. Pat. No. 10,271,022, which, in turn, claims the priority benefit of provisional application No. 62/262,087 filed Dec. 2, 2015.

TECHNICAL FIELD

The present disclosure relates to a wearable illuminating and video recording device that can be worn on the body of a user, particularly on the user's wrist. The disclosure also relates to a system encompassing the wearable illuminating and video recording device for use in conjunction with a firearm and to methods of using the described device and system. Although the present disclosure will be shown and described herein primarily by way of reference to the preferred embodiment wherein the wearable illuminating and video recording device is incorporated into a watch device wearable on the wrist of a user, e.g., a wristwatch, it will be recognized that the present device can be configured as a wrist worn recording device without a watch.

SUMMARY

Described herein is a wearable illuminating and video recording device. The wearable illuminating and video recording device includes a housing containing a port in a surface of the housing, an LED light source within the housing and positioned to emit light through the port, and a power supply within the housing and capable of providing power to operate the LED light source. The device is designed to be wearable on the wrist of a user and may be integral with a wristwatch.

Also provided is a wearable illuminating and video recording system for use in conjunction with a handheld firearm. The system includes a housing containing two or more ports in a surface of the housing, including a camera port and one or more illumination ports. An illumination source (e.g., an LED flashlight having one or more LED elements) is positioned within the housing adjacent each illumination port and is configured to emit light through the aligned illumination port. A camera module is received within the housing and includes a photosensitive array positioned to detect images through the camera port and a recording module. The recording module is disposed within the housing and includes processing electronics for receiving output from the photosensitive array and generating video data representative thereof. The recording module includes a storage medium is coupled to the processing electronics for storing the video data. A power supply is received within the housing for providing power to operate the illumination source, camera module, and recording module, a radio-frequency identification chip within the housing.

In a further aspect, a system is provided which includes a wearable illuminating and video recording device and a handgun which are configured to communicate via a two-way radio frequency (RF) communications link. A circuit, e.g., a circuit board or other circuitized substrate, may be attached to the firearm. The circuit may be of the type configured to control operation of the firearm. In certain embodiments, the circuit includes a radio frequency identification (RFID) reader. In certain embodiments, the illuminating and video recording device includes an RF tag operable to communicate with the RFID reader. The RF tag may be active, semi-active, or passive. The RFID reader is operable to transmit signals to the RF tag and receive signals therefrom. The RFID tag stores information which is transmitted to the RFID reader upon interrogation by the RFID reader. The information stored in the RF tag and transmitted to the RFID reader is keyed to the firearm and unlocks or otherwise enables operation of the firearm when the RF tag is within communication range of the RFID reader.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
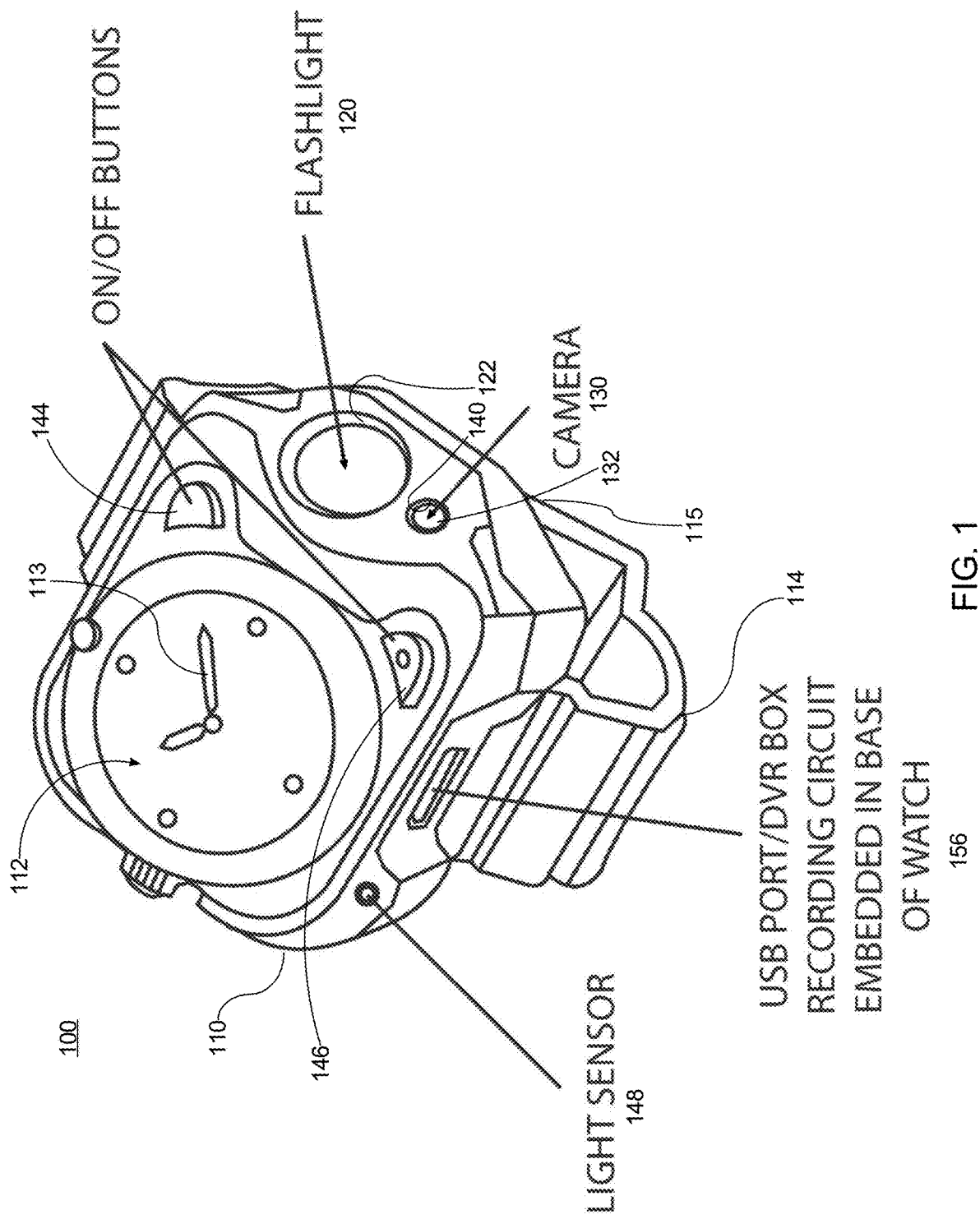
FIG. 1 is an isometric view of an exemplary video recording and illumination device according to the present disclosure.
Figure 2:
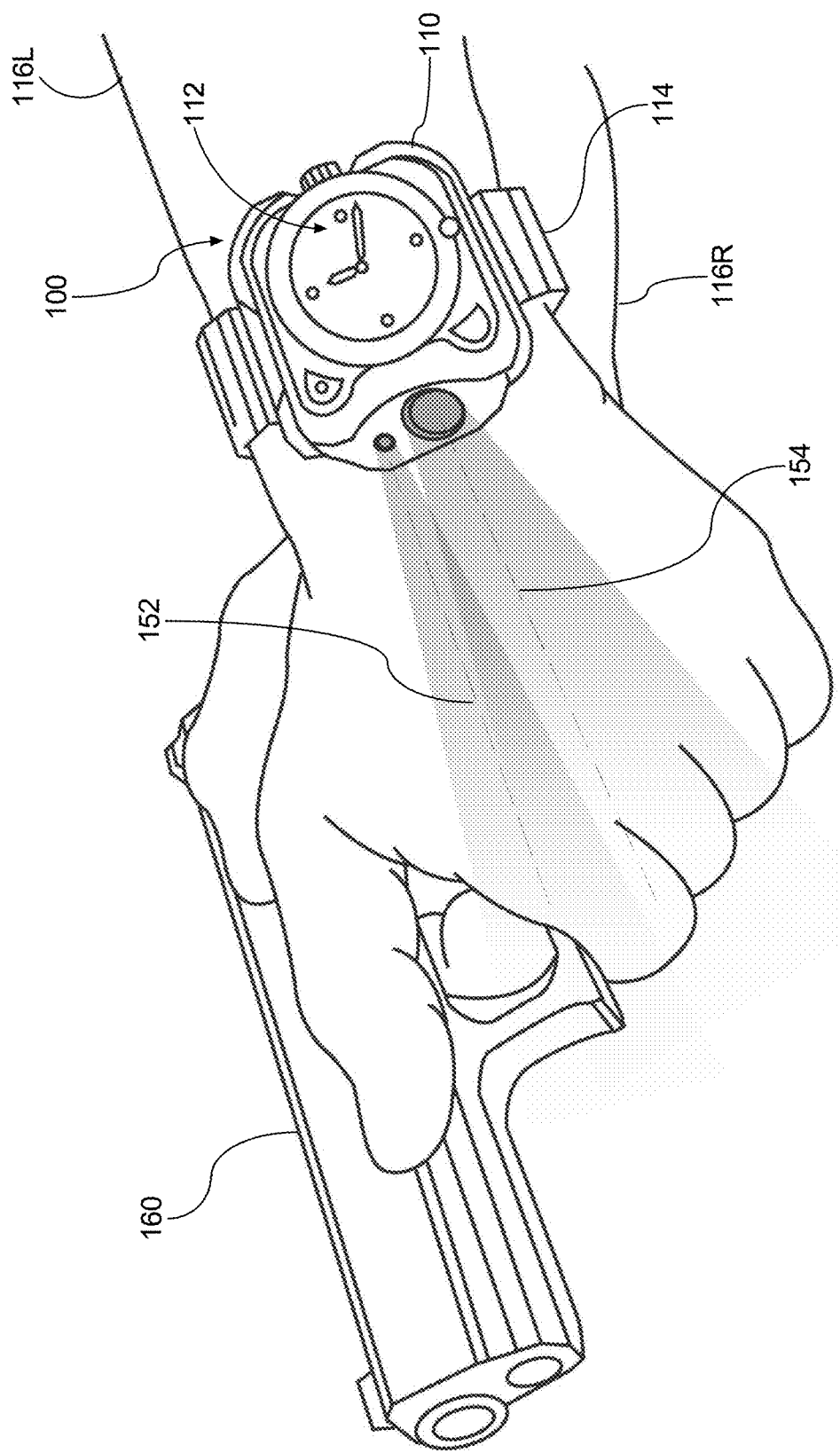
FIG. 2 is an isometric view showing the device appearing in FIG. 1 illustrating the video recording and illumination device as worn by a user holding a firearm.
Figure 4:
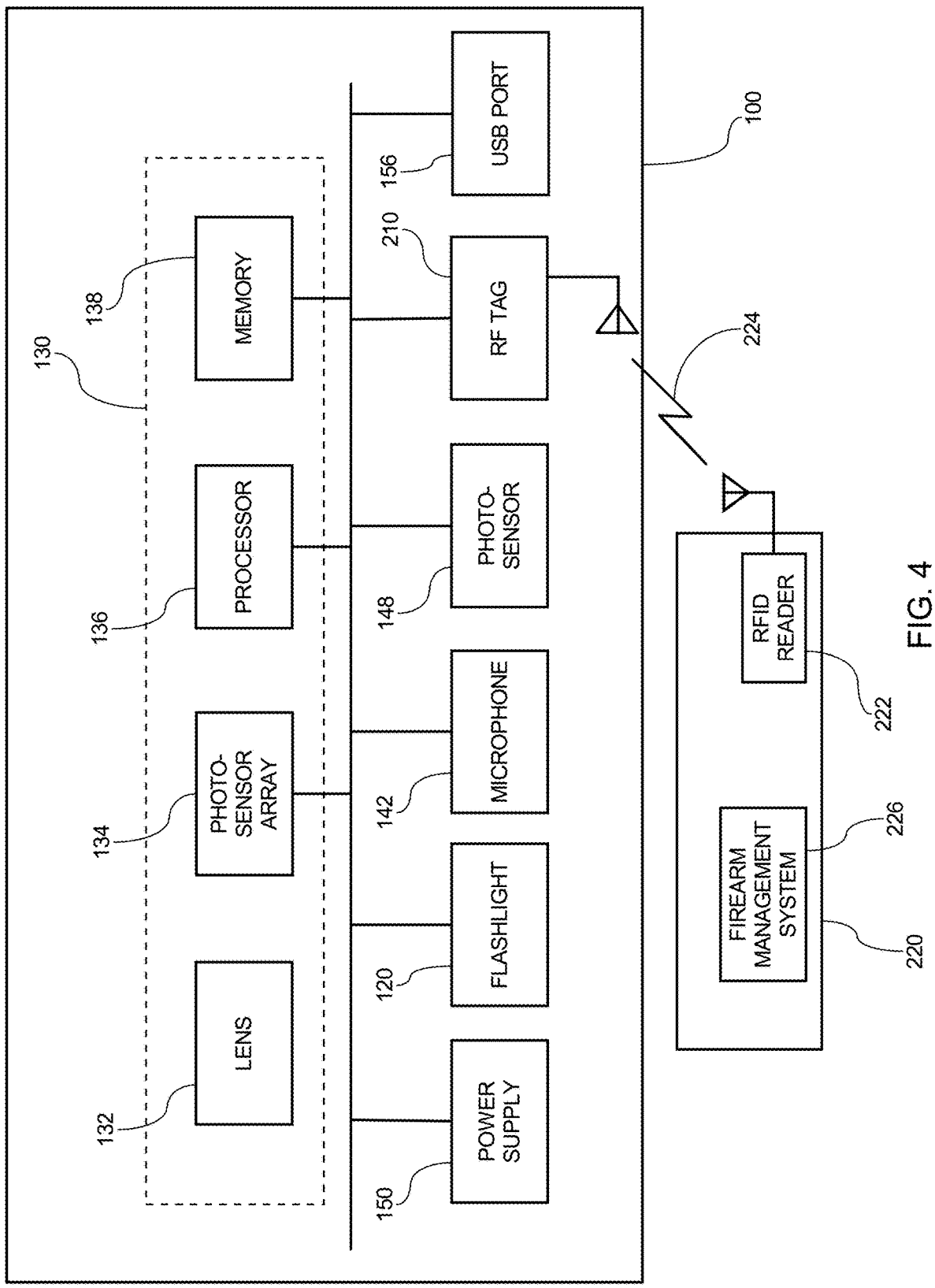
FIG. 4 is a block diagram illustrating an exemplary embodiment.

Referring now to the drawings and, in particular, FIGS. 1, 2, and 4, the present disclosure relates to a wearable, combined illuminating and video recording device, designated generally as 100. The device 100 is adapted to be wearable on the body of a user. In the illustrated preferred embodiment, the device 100 is wearable on the wrist of a user and is configured as a wristwatch including a housing 110 enclosing an optional clock or time keeping module 112. The watch module 112 may include an analog movement 113 or a digital/electronic display (not shown), as would be understood by persons skilled in the art. The watch module 112 may be mechanical or electronic. In the case of an electronic watch module 112, the watch module may be powered by the power supply 150 as described below. The device 100 includes a band or strap 114 for securing the device 100 around a wrist 116L of the wearer. In alternative embodiments, the device 100 may be configured to be wearable on the arm, leg, ankle, waist, or head of the user, or elsewhere on the body.

The wearable illuminating and video recording device 100 includes a light source 120 situated within a housing. The light source is capable of emitting light through a first port defining an illumination or flashlight port or aperture 122 in the housing 110 to illuminate a field of view of the user. In preferred embodiments, a means 124 for focusing or directing a beam may be provided. The beam focusing means may be, for example, a reflector such as a parabolic reflector, refractive or diffractive optical lens, spherical lens, aspheric lens, collimating lens, or the like. Although the light diffuses as it is emitted from the light source, the field of illumination has a center point that defines an axis of illumination from the light source. In certain embodiments, focusing optics, such as one or more refractive or diffractive optical elements, may be movably positioned over the port 122 to focus the angular spread of the rays of light emitted by the light source. In certain embodiments wherein the focusing or directing means 124 is a reflector, a plano or non-focusing lens may be provided over the port 122 to protect the light source 120.

The light source 120 may be one or more LED lights, although other types of light elements are contemplated, such as incandescent (including halogen) lamps, laser illumination devices, and the like. In certain embodiments, the light source 120 is capable of providing light of different intensities. Thus, in certain embodiment, the device may be able to operate in different modes, with each mode having a different intensity of light emitted from the light source. For example, the device may be adjustable so that the light source emits light of 1, 3, 5, 10, 15, 20, 30, 60, 100, 150, 180, 200, 250, 300, 400, or 500 lumens in different modes. In certain embodiments, the light source emits visible light. Alternatively, the light element which emits in the infrared (IR) range, e.g., for use when the user is wearing a night vision device.

The wearable illuminating and video recording device 100 also includes a camera module 130. The camera 130 includes a lens system 132, a light-sensing medium or array 134, processing electronics 136, and an electronic storage medium 138. The light sensing medium or array may be a charge-coupled device (CCD), complementary metal oxide semiconductor (CMOS) image sensor, N-type metal oxide semiconductor (NMOS) image sensor, or the like. The lens system 132 includes one or more optical elements, such as one or more refractive and/or diffractive optical elements in optical communication with the light sensing medium 134. The lens system 132 may have a fixed focal length or, alternatively, may include a focusing mechanism, such as an autofocus mechanism as would be understood by persons skilled in the art. The lens system 132 is positioned to detect images through a second port defining an imaging port 140 in the housing 110. In certain embodiments, the camera 130 may operate as a pinhole camera wherein the lens system 132 is omitted.

The lens system 132 and light source 120 are co-aligned so that the principal axis 152 of the camera lens and axis of illumination 154 from the light source are generally parallel. As used herein, the term generally parallel means that the axis 152 and the axis 154 are sufficiently parallel such that rays of light emitted by the light source will fall on the object or scene to be imaged by the camera 130. This enables the camera 130 to capture images in a field illuminated by the light source, e.g., when recording video images indoors, at night, or under other low light conditions.

In certain embodiments, the camera 130 is capable of recording continuous video images and still images. In certain embodiments, the camera further includes a microphone 142 for recording an audio signal for digitization and storage in conjunction with the video data, which may be stored in a known encoded format, such as MP3, WAV, and so forth. Unless stated otherwise, terms such as video data, video signal, video recording, and the like are intended to encompass audiovisual data, audiovisual signals, audiovisual recordings, etc., unless specifically stated otherwise.

In certain embodiments, the camera includes one or more output devices for outputting a state of operation of the camera. For example, in certain embodiments, a vibrating mechanism may be provided to provide tactile feedback when a recording operation is started or stopped. Alternatively, one or more indicator lights may be provided on the housing to provide a visual indication of when a recording operation is started or stopped. In still other embodiments, an audio output device such as a speaker or piezoelectric element may be provided to provide an audible indication or alert when a recording operation is started or stopped.

The wearable illuminating and video recording device 100 also includes a power supply 150. The power supply is electrically coupled to the light source 120 and the camera 130 to supply power to these components. The power supply may be a battery or battery pack, for example, a disposable battery such as a lithium battery, or a rechargeable battery such as a lithium-ion battery, nickel-cadmium battery, nickel metal hydride battery, and so forth. In certain embodiments, the battery may be enclosed within the housing and charging circuitry may be included for electrically charging the battery without removal of the battery from the housing. Alternatively, the battery may be removable from the housing, e.g., for disposal and replacement when uncharged or, in the case of a rechargeable battery, for charging using an external battery charger. In certain embodiments wherein the battery is rechargeable, a solar (photovoltaic) cell may be provided on the housing in electrical communication with the battery. Alternatively, the battery may be recharged via charging contacts provided on the housing or via an induction circuit for non-contact battery charging.

Because preferred embodiments of the wearable illuminating and video recording device 100 are designed to be worn on the wrist, the device may have features of a wristwatch. In the illustrated preferred embodiment, the device 100 incorporates the watch/time-keeping device 112 as described above. The housing 110 of the wearable illuminating and video recording device 100 may be the case body of a wristwatch or may have features similar to those of a case body of a wristwatch. For example, in certain embodiments, the housing 112 may include seals, gaskets, etc., around openings to provide a water-resistant or waterproof housing. Alternatively or additionally, the housing may be ruggedized, e.g., using shock absorbing materials or components to allow the unit 100 withstand shock. In certain embodiments, the time keeping device 112 is synchronized with the camera system, wherein time information is stored electronically in association with the video recordings. In other embodiments, the processing electronics may include a clock for recording time information along with image video information which is independent of the time appearing on the watch 112.

The wearable illuminating and video recording device 100 may also include the band or strap 114 attached to the housing to enable the device to be easily and removably secured to the user's wrist 116L. While the present embodiment is illustrated with respect to a user wearing the device 100 on the left wrist 116L, it will be recognized that the present development can likewise be adapted to be worn on the right wrist 116R. The band or strap 114 may be strap or band similar to those used for wristwatches. The strap or band may contain nylon, rubber, canvas, plastic, metal, leather, or any other material used for bands or straps of wristwatches. The band 114 fastener may include a fastener 115 such as a buckle, button, snap, hook-and-loop fastener, or any other means used to secure wristwatches.

As for a wristwatch, the mass of the wearable illuminating and video recording device is low enough to allow a user to wear it comfortably for extended periods. For example, the wearable illuminating and video recording device may weigh less than about 300, about 200, about 150, about 100, about 80, or about 50 grams.

The illumination port 122 in the housing of the wearable illuminating and video recording device allows the light source to emit a cone of light toward a subject. In analogy to the case body of a wristwatch, the housing 112 has a back that is in proximity to the user's wrist and a front or face that is opposite the back of the housing. In embodiments incorporating a watch 112, the time is displayed on the face in human viewable form. Continuing the analogy, the housing 112 has a top and bottom, both of which may be attached to a fastener, and left and right sides. The ports for the light source and camera may be located on either the left or right side of the housing, for wearing the wearable illuminating and video recording device on the right or left wrist, respectively. Alternatively, the device 100 may be configured with an electronic display which can be rotated 180 degrees, depending on whether the user intends to wear the device 100 on the left or right wrist. In certain embodiments having a video display, the processing electronics 136 may include an associated video codec for playing back video recordings stored in the memory 138. A data port 156, such as a serial or parallel data port, Universal Serial Bus (USB) port, IEEE 1394 (Fire Wire) port, or the like is provided for transferring recorded video information to a computer-based information handling system. In alternative embodiments, a RF transmitter may be provided for transmitting video information to a computer-based information handling system in accordance with a promulgated protocol, such as Bluetooth, Wi-Fi, ZigBee, or the like.

In certain embodiments, an "on" button 144 and an "off" button 146 are provided on the housing 110 and are operable to start and stop recording by the camera 130. In certain embodiments, a light sensor 148 is provided which detects the intensity of the ambient lighting. The sensor 148 may be, for example, a photo resistor, photodiode, phototransistor, or the like. When the intensity or brightness of the ambient lighting falls below a preselected threshold, the flashlight 120 automatically actuated when starting a recording operation. If the intensity or brightness of the ambient lighting is at or above a preselected threshold, operation of the video camera module 130 does not actuate the flashlight 120.

In the preferred embodiments, when a user wearing the device on his or her wrist and has his or her arms fully extended, as when aiming or preparing to fire a handgun, the device 100 is positioned so that ports 122 and 140 are facing outward and the axis of illumination 154 and the principal axis 152 of the camera lens are essentially parallel to the user's arm. FIG. 2 illustrates a typical manner of holding and aiming a handgun 160, wherein the handgun is held in the shooter's right hand, with the right arm extended out in front of the body, e.g., toward a target. The left hand, in turn, is placed on the other side of the handgun 160 and is used to support the right hand. The positions of the flashlight module 120 and the camera module 130 on the device 100 are such that the optical axis 152 of the camera 130 and the optical axis 154 of the light source 170 will also be generally aligned with the longitudinal axis of the firearm barrel, thereby allowing the device 100 to acquire a video recording of the target area.

Figure 3:
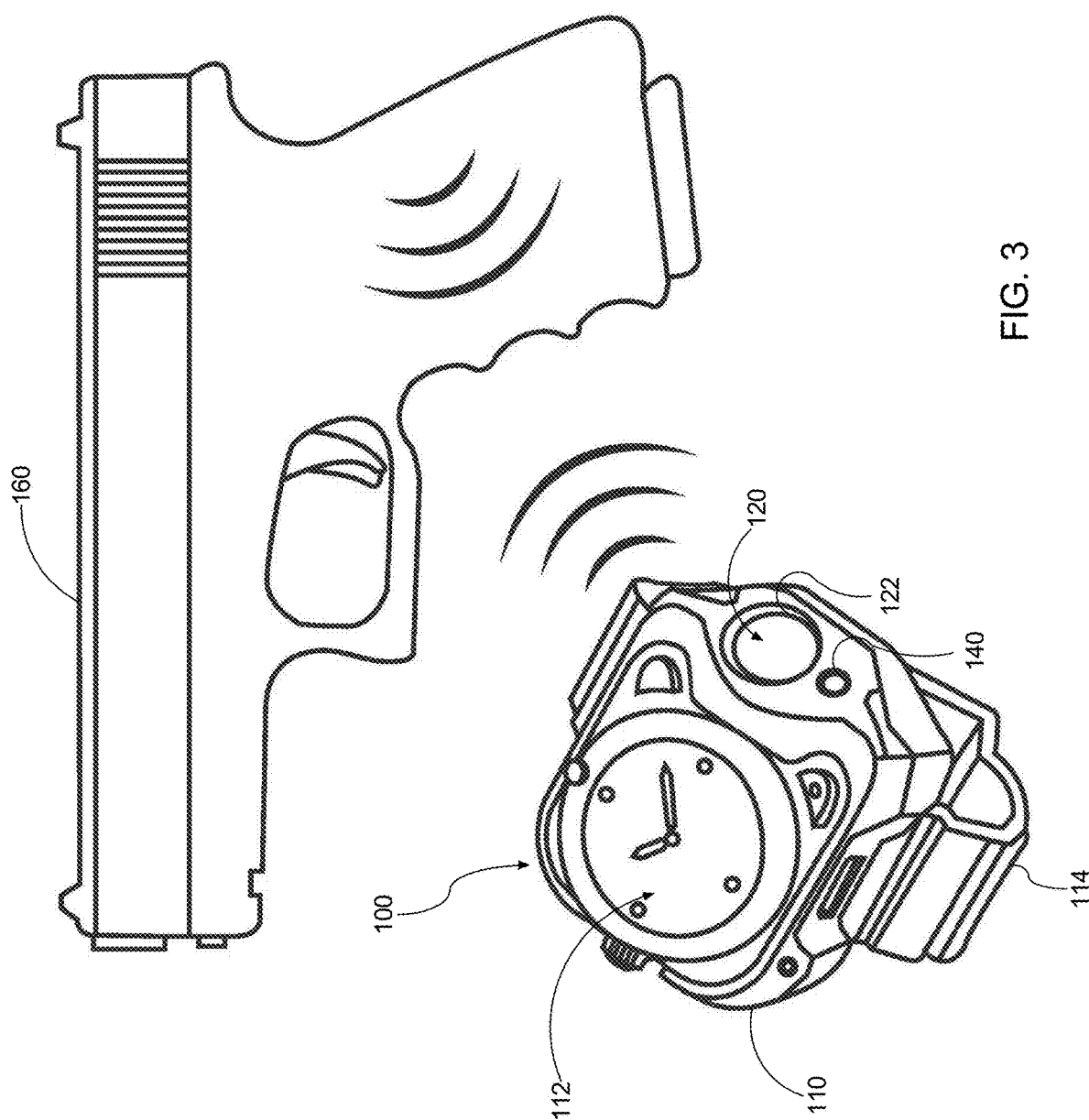
FIG. 3 illustrates a preferred embodiment video recording and illumination device which includes an RFID chip which is keyed to an RFID interrogator in the handgun.

Referring now to FIG. 3, the wearable illuminating and video recording device 100 may include an optional RF tag 210 within the housing 110 and an optional circuit 220 including an RFID reader 222 disposed on or within the handgun 160 for communicating with the RF tag 210. The RF tag 210 may be active, semi-active, or passive. The circuit 220 including the RFID reader 222 may be implemented on a separate circuit board that can be attached to a firearm, or may comprise a module or component incorporated within a firearm management, safety, or control system. The RF tag 210 and RFID reader 222 are capable of sending and receiving electromagnetic signals 224 to and from each other, thereby allowing the wearable illuminating and video recording device 100 to be wirelessly coupled to the firearm 160.

In embodiments employing a passive RF tag 210, the passive RF tag 210 may not be suitable for initiating communications with the RFID reader 222, but must be read, i.e., wherein the RF tag 210 is powered by the RF waves transmitted by the RF reader 222 for reading the RF tag 210. The RF tag 210 stores information that is read by the RF reader 222. In preferred embodiments, the communication range between the RF reader 222 and the RF tag 210 is short, wherein the RF tag 210 operates as a proximity token to prevent operation of the handgun 160 unless the RF tag 210 is within reading range of the RFID reader 222. In preferred embodiments, the communication range is in the range of 0 to 1 meter, preferably 0-80 centimeters, and more preferably 0 to 50 centimeters.

In certain embodiments, the RF tag 210 cooperates with the RFID reader 220 to control the operation of the firearm 160. For example, in certain embodiments, the RFID circuit 220 is coupled to an optional firearm management system 226 or other locking or safety mechanism of the firearm 160, wherein the firearm 160 remains locked unless it receives a signal such as a signal transmitting stored identification data from the RF tag 210 responsive to an interrogation signal from the RFID reader 220. In such embodiments, the firearm 160 becomes unlocked only when the RF tag 222 within the wearable illuminating and video recording device is within a distance defined by the communication range between the RF tag 210 and the RF reader 222. This decreases the likelihood that one who is not wearing the device 100 will be able to discharge the firearm 160. Consequently, this serves as a safety feature to minimize the possibility that a firearm will be used by anyone other than the official to whom it has been assigned.

In certain embodiments, when the RFID tag 210 is within transmission range of the handgun 160 and an interrogation signal from the reader 222 is received by the RF tag 222, the processor 136 automatically turns on the camera module 130 and flashlight module 120 under pre-programmed control. In certain embodiments incorporating a light sensor 148, the processor 136 is configured to turn on the camera module 130 only when the ambient light is above the predetermined intensity or brightness threshold level.

In certain embodiments wherein the camera module 130 and optionally the flashlight 120 are configured to be turned on automatically, e.g., when the handgun 160 and recording device 100 are brought within the communication range of the reader 222 and the RF tag 210, the camera 130 continues recording until the recording function is manually turned off by the user. In alternative embodiments wherein the camera (and optionally the flashlight) is turned on automatically, the RFID reader 222 continues to interrogate the RF tag at periodic intervals and the camera 130 continues to record video data until the recording device 100 is moved out of communication range of the RFID reader 222.

What is claimed is:

1. A method of controlling operation of a video recording device, comprising:
    providing a firearm having an RFID reader;
    providing a wearable video recording device having a RF tag capable of transmitting a signal to the RFID reader in response to an interrogation signal received from the RFID reader, the RF tag and the RF reader having a communication range; and using the RFID reader to transmit a signal to the RF tag operable to actuate the video recording device when the RF tag and the RFID reader are within said communication range.

2. The method of claim 1, wherein the wearable video recording device includes:
   a housing comprising a first port and a second port in a surface of the housing;
   a light source disposed within the housing and positioned to emit light through the first port;
   a camera disposed within the housing and configured to record images through the second port; and
   a power supply disposed within the housing and configured to operate the light source and the camera.

3. The method of claim 2, wherein the wearable video recording device further includes a recording module disposed within the housing and capable of receiving a video signal from the camera and storing data representative of the video signal.

4. The method of claim 2, wherein the wearable video recording device is configured to be worn on a wrist of a user, and wherein the first port and the second port are positioned on the housing to face a target area when the user is wearing the device and the user's arms are fully extended as when aiming or preparing to fire said firearm toward the target area.

* * * * *